US006884191B2

(12) United States Patent
Temma et al.

(10) Patent No.: US 6,884,191 B2
(45) Date of Patent: Apr. 26, 2005

(54) STEPLESS SPEED CHANGE UNIT

(75) Inventors: Yasuyuki Temma, Ikeda (JP); Takafumi Oshibuchi, Ikeda (JP); Hisayasu Murakami, Ikeda (JP)

(73) Assignee: Daihatsu Motor Co., Ltd., Ikeda (JP)

( * ) Notice: Subject to any disclaimer, the term of this patent is extended or adjusted under 35 U.S.C. 154(b) by 42 days.

(21) Appl. No.: 10/148,203

(22) PCT Filed: Feb. 19, 2001

(86) PCT No.: PCT/JP01/01175

§ 371 (c)(1),
(2), (4) Date: Jun. 7, 2002

(87) PCT Pub. No.: WO01/88411

PCT Pub. Date: Nov. 22, 2001

(65) Prior Publication Data

US 2002/0183149 A1 Dec. 5, 2002

(30) Foreign Application Priority Data

May 19, 2000 (JP) ........................................ 2000-147549

(51) Int. Cl.$^7$ ................................................. F16H 7/08
(52) U.S. Cl. ........................ 474/109; 474/133; 474/135
(58) Field of Search ............................. 474/8, 101, 110, 474/111, 126, 133, 135, 138, 134, 103

(56) References Cited

U.S. PATENT DOCUMENTS

| 5,286,233 A | * | 2/1994 | Engelstad et al. ........... 474/101 |
| 5,378,198 A | * | 1/1995 | Moroto et al. .................. 474/8 |
| 5,410,923 A | * | 5/1995 | Yamashita et al. ....... 74/473.26 |
| 5,820,503 A |   | 10/1998 | Bruchner et al. |

FOREIGN PATENT DOCUMENTS

| CN | 2077576 U | 5/1991 |
| DE | 1 136 850 | 6/1960 |
| DE | 1 136 850 | 9/1962 |
| DE | 2 159 018 | 11/1971 |
| DE | 2 159 018 | 5/1973 |
| DE | 38 38 754 | 6/1989 |
| DE | 198 22 632 | 11/1999 |
| JP | 60-69859 | 5/1985 |
| JP | 2-107859 | 8/1990 |
| JP | 2-121664 | 10/1990 |
| JP | 3-199719 | 8/1991 |
| JP | 5-106700 | 4/1993 |
| JP | 5-280613 | 10/1993 |

OTHER PUBLICATIONS

Copy of European Patent Office Action for corresponding European Patent Application No. 01906137 dated Jun. 5, 2003.

Copy of European Patent Office Action for corresponding European Patent Application No. 01 906 137.3 dated Sep. 26, 2003.

* cited by examiner

Primary Examiner—David A. Bucci
Assistant Examiner—Vicky A. Johnson
(74) Attorney, Agent, or Firm—Armstrong, Kratz, Quintos, Hanson & Brooks, LLP

(57) ABSTRACT

A continuously variable transmission having an endless V belt running across a driving pulley and a driven pulley, a transmission ratio changing mechanism for changing the running diameters of the belt around the pulleys radially in opposite directions to each other, and a tension-adjusting unit for pressing the belt to obtain belt tension. The tension-adjusting unit includes a tension roller coming into pressure contact with the slack side of the belt from outside, a swing arm having an end rotatably supported on a transmission case, a link member having an end rotatably supporting a shaft of the tension roller and another end rotatably coupled with another end of the swing arm, and an urging member for swingingly urging the swing arm so that the tension roller presses the belt. A linkage structure having two degrees of freedom is used for supporting the tension roller, so that the tension roller can automatically move to a position where it does not interfere with either pulley at any transmission ratio.

8 Claims, 18 Drawing Sheets

[IN REVERSE MOVEMENT]

Fig. 16
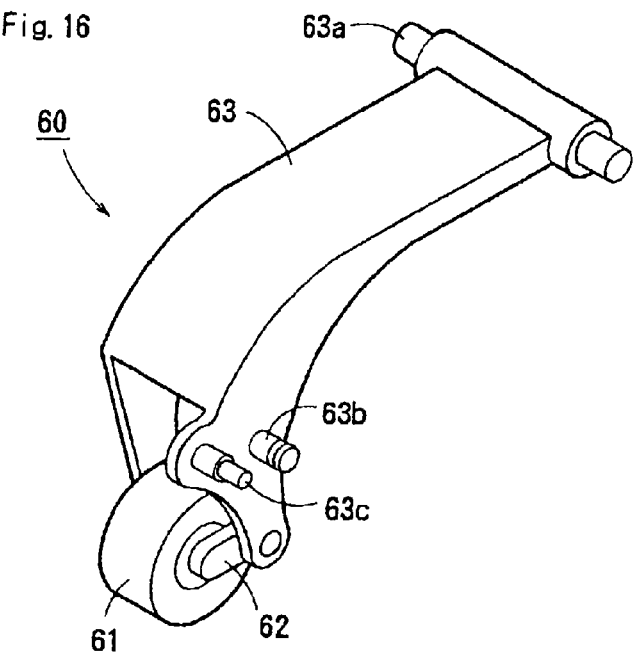
Fig. 17 [High]
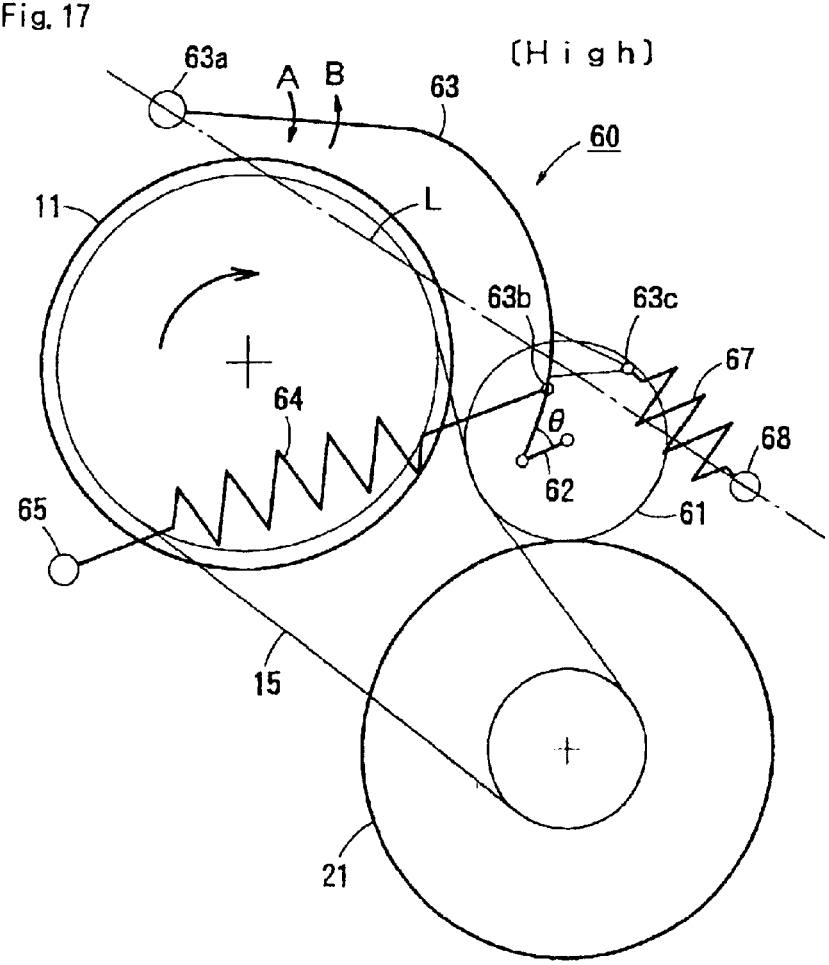

STEPLESS SPEED CHANGE UNIT

BACKGROUND OF THE INVENTION

1. Field of the Invention

The present invention relates to a continuously variable transmission, and more particularly, to a V belt continuously variable transmission for an automobile.

2. Description of the Related Art

In general, various types of continuously variable transmissions have been proposed and put into practice. A general continuously variable transmission includes a driving pulley, a driven pulley and an endless V belt running across these pulleys, in such a way that the transmission ratio can be continuously variable by changing the running diameters of the belt around the driving pulley and the driven pulley radially in opposite directions. Thus, the continuously variable transmission can implement smooth driving without shift shock.

Japanese Unexamined Patent Application Publication No. 5-280613 (1993) proposes a continuously variable transmission including actuators for changing the running diameters of a belt around a driving pulley and a driven pulley, respectively, a transmission ratio changing mechanism for interlocking the actuators such that the running diameters of the belt around those pulleys are changed radially in opposite directions to each other so as to make the transmission ratio variable, and a tension generating mechanism for pressing the slack side of the belt running across the pulleys so as to have the belt tension larger than that naturally generated depending on the transmission ratio. This tension generating mechanism is formed by an arm swingably supported on a transmission case, a tension roller rotatably mounted on one end of the arm and a spring urging the arm so that the tension roller presses the outer surface of the slack side of the belt.

However, in the tension generating mechanism having the aforementioned structure, where the tension roller is rotatably mounted on one end of the arm and the arm is urged by the spring for pressing the tension roller against the belt, such a problem may occur that the tension roller disadvantageously interferes with the driving pulley or the driven pulley. This is because the tension roller moves along the rotation locus of the end of the arm. Even if the rotation axis or the length of the arm is set such that the tension roller interferes with neither pulley at the lowest transmission ratio or the lowest vehicle speed ratio, the tension roller may interfere with either pulley at the highest transmission ratio or the highest vehicle speed ratio. Therefore, it is difficult to set the rotation axis or the length of the arm such that the tension roller does not interfere with the pulleys at any transmission ratio. If the distance between the axes of the driving pulley and the driven pulley were increased, the tension roller could be arranged so as not to interfere with either pulley at any transmission ratio. This case, however, would cause a problem in that the size of the transmission body itself is disadvantageously increased.

Even if the tension roller can be arranged so as not to interfere with either pulley in an initial stage, the position of the tension roller may be varied when the pulleys are worn down or the belt is elongated due to endurance driving test or the like. As a result, the tension roller may come to disadvantageously interfere with the pulleys.

Accordingly, an object of the present invention is to provide a continuously variable transmission that is capable of reliably preventing interference between a tension roller and a pulley at any transmission ratio while solving the aforementioned problems.

SUMMARY OF THE INVENTION

This object can be attained by a continuously variable transmission according to the present invention. The transmission of the present invention comprises a belt running across a driving pulley and a driven pulley, a transmission ratio changing mechanism for changing the running diameters of the belt around the pulleys radially in opposite directions to each other, and a tension-adjusting unit for pressing the belt so as to generate belt tension. The tension-adjusting unit includes a tension roller coming into pressure contact with the slack side of the belt from outside, a swing arm swingably mounted on a transmission case, at least one link member for linking the tension roller to the swing arm, and urging means for urging the swing arm in such a direction that the tension roller presses the belt.

According to the present invention, the transmission ratio changing mechanism operates only to change the running diameters of the belt around the driving pulley and the driven pulley radially in directions opposite to each other, whereas the tension-adjusting unit independently operates to generate belt tension so that the belt will not slip on the pulleys. The tension-adjusting unit presses the slack side of the belt with the tension roller from outside, thereby generating proper belt tension. When the belt is pressed at its slack side from outside like this, the belt is prevented from being excessively tensioned, and power transmission efficiency is improved because the contact areas of the belt running around the pulleys are increased.

The tension roller of the present invention is mounted on the swing arm, which is swingably supported on the transmission case, not directly but via one or a plurality of link members, whereby support means for the tension roller can be in a linkage structure having at least two degrees of freedom. As a result, the tension roller can automatically move to a position where it does not interfere with the pulleys at any transmission ratio ranging from the highest to the lowest transmission ratios. Thus, interference between the tension roller and the pulleys can be reliably prevented even when the pulleys are worn down or the belt is elongated due to endurance driving or the like. Further, the distance between the axes of the driving pulley and the driven pulley need not be increased for preventing interference between the tension roller and the pulleys, whereby the size of the transmission body can be miniaturized.

A rotation axis of the swing arm is preferably provided on a position outside of the driving pulley and closer to the driving pulley than to the driven pulley. When the rotation axis of the swing arm is provided closer to the driving pulley like this, the angle between the swing arm and the link member is narrower at a low transmission ratio as compared with those angles at a middle transmission ratio and at a high transmission ratio such that the tension roller is strongly pressed against the belt. Therefore, the belt tension can be increased at the low transmission ratio as compared with that at the higher transmission ratios, whereby the power transmittal efficiency is effectively improved and the life span of the belt is increased.

If the urging means for swingingly urging the swing arm consists of a spring which swingingly urges the swing arm in such a direction that the tension roller presses the slack side of the belt from outside, the structure of this urging means is most simplified and the cost is reduced. The spring may be a tension spring or a compression spring. Alternately, a torsion spring may be provided on the rotation axis of the swing arm.

The urging means for swingingly urging the swing arm preferably includes a spring which swingingly urges the swing arm in such a direction that the tension roller presses the slack side of the belt from outside, and an assist motor which adjusts the rotational force of the swing arm so as to control the pressing force of the tension roller. When the tension roller is pressed against the belt by the spring alone, the belt tension cannot be adjusted to a desirable level that is responsive to the transmission ratio, since the spring force varies in proportion to the amount of its deformation. When the power of the assist motor is added to or subtracted from the spring force, therefore, the belt tension can be adjusted to a desired level. Further, because the belt tension is obtained by adding or subtracting the power of the assist motor to or from the spring force, the belt tension can be varied over a wide range even by using an assist motor generating relatively small torque.

In order to transmit the torque of the assist motor to the swing arm, an arcuate gear may be formed on the forward end of the swing arm so that the arcuate gear meshes with a pinion gear driven by the assist motor. Alternately, the swing arm at its swinging axis may be driven by the assist motor. In the former case, the torque generated by the motor may be relatively smaller.

In case a single spring is used for swingingly urging the swing arm, and when the belt tension at the middle transmission ratio is set to the level necessary for driving the belt, the belt tension at the low and the high transmission ratios may become so high as to reduce the life span of the belt. On the other hand, when the belt tension at the low and the high transmission ratios is set to a level aiming to preserve long life span of the belt, the belt tension at the middle transmission ratio may become so insufficient that the belt would slip on the pulleys.

A first spring and a second spring are provided on the tension-adjusting unit so that joined forces of those two springs are applied to the swing arm. The belt pressing force of the first spring is set to be large at the high and the low transmission ratios, and small at the middle transmission ratio. On the other hand, the second spring consists of a compression spring having an end rotatably supported on the transmission case and another end rotatably coupled to the swing arm. When the transmission ratio changes, the urging force direction of this second spring also changes such that the rotational force of the swing arm in a direction for pressing the belt caused by this second spring at the middle transmission ratio exceeds those forces at the highest and the lowest transmission ratios. In other words, by utilizing the swinging of the arm which depends on the transmission ratio, the urging force direction of the second spring is changed.

In this way, the belt tension characteristic, which changes in accordance with the transmission ratio, obtained by the second spring is inverse to that obtained by the first spring. Therefore, even if the first spring causes excessive belt tension at the low and the high transmission ratios or insufficient tension at the middle transmission ratio, the belt tension can be reduced at the low and the high transmission ratios or increased at the middle transmission ratio due to the action of the second spring. Thus, employing the first and second springs together can solve both of the problems with respect to insufficient tension at the middle transmission ratio and excessive tension at the low and the high transmission ratios, thereby providing a desirable belt tension characteristic.

The middle transmission ratio may not necessarily have just the central transmission ratio between the lowest and the highest transmission ratios, but may have any transmission ratio around the central ratio between the lowest and the highest transmission ratios.

The second spring is preferably so arranged that a coupling point of the second spring to the swing arm at the highest and the lowest transmission ratio is located opposite to the belt with reference to a straight line connecting an end of the second spring and an end of the swing arm.

In this case, at the highest and the lowest transmission ratios, the direction of rotational force of the swing arm caused by the second spring becomes opposite to that caused by the first spring. Consequently, even when the first spring is set to cause excessive belt tension at the lowest and the highest transmission ratios, the second spring can correct the belt tension so as to obtain a desirable tension characteristic.

Various means can be employed for the transmission ratio changing mechanism according to the present invention. It is preferable to rotate a ratio-changing gear of the driving pulley and a ratio-changing gear of the driven pulley by means of a single ratio-changing motor via a gear train, such that by the rotation of those ratio-changing gears, ball screws provided on the respective pulleys are driven so as to axially move movable sheaves of the pulleys. In this case, the movable sheaves of both pulleys can be operated stably to change the diameters synchronously and radially in opposite directions to each other.

BRIEF DESCRIPTION OF THE DRAWINGS

FIG. 16 is a perspective view of a swing arm of the tension-adjusting unit shown in FIG. 14;

FIG. 17 illustrates a position of contact between a tension roller and a belt at the highest transmission ratio in the continuously variable transmission shown in FIG. 14;

DESCRIPTION OF THE PREFERRED EMBODIMENTS

Figure 5:
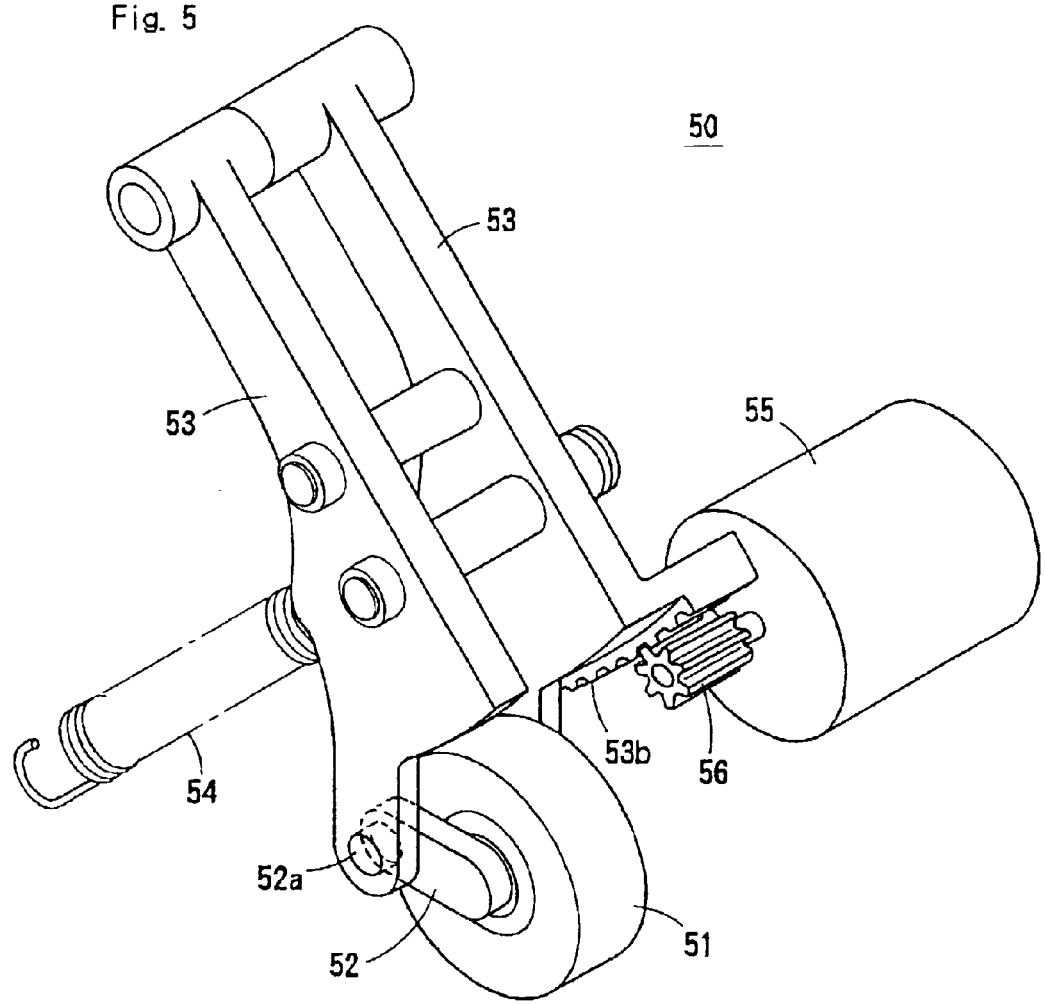
FIG. 5 is a perspective view of an example of the tension-adjusting unit.
Figure 6:
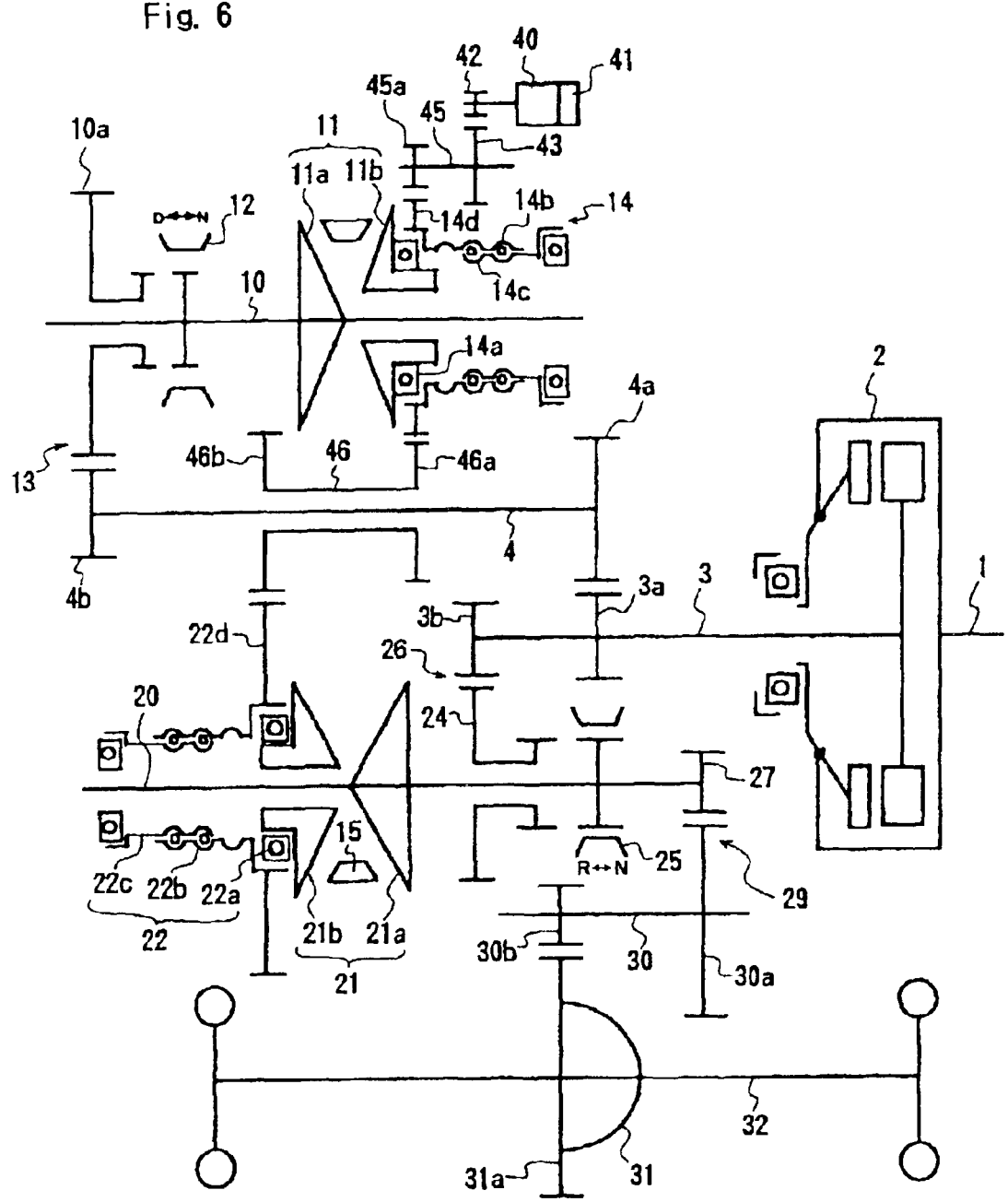
FIG. 6 is a skeleton diagram of the continuously variable transmission shown in FIG. 1.

FIGS. 1 to 13 show a continuously variable transmission according to a first embodiment of the present invention. FIGS. 1 to 4 show the specific structure of the continuously variable transmission, and FIG. 6 shows the skeleton structure thereof.

This continuously variable transmission, which is employed in a vehicle having a transversely mounted FF (front engine-front drive) drive system, generally comprises a starting clutch 2 driven by an engine output shaft 1, an input shaft 3 forming an output shaft of the clutch 2, a power shaft 4, a driving shaft 10 having a driving pulley 11, a driven shaft 20 having a driven pulley 21, an endless V belt 15 running across the driving pulley 11 and the driven pulley 21, a reduction shaft 30, output shafts 32 coupled with wheels, a ratio-changing motor 40, a tension-adjusting unit (tensioner) 50 and the like. The input shaft 3, the power shaft 4, the driving shaft 10, the driven shaft 20, the reduction shaft 30 and the output shafts 32 are non-coaxially arranged in parallel with each other.

According to this embodiment, the clutch 2 is formed by a dry clutch, which can be engaged/disengaged and half-engaged by operating a release fork 2a by a clutch control motor (not shown).

The input shaft 3 is rotatably supported by a transmission case 6 via a bearing, while a forward gear (forward movement gear) 3a and a reverse gear (reverse movement gear) 3b integrally provided on the input shaft 3 are located in a second gear chamber 6c of the transmission case 6.

The power shaft 4 is extended between the right and left sidewalls of the transmission case 6, such that both ends thereof are rotatably supported by bearings. A forward gear (forward movement gear) 4a meshing with the forward gear 3a of the input shaft 3 is integrally provided on an end of the power shaft 4 closer to the engine. A reduction gear 4b is fixed to another end of the power shaft 4 opposite to the engine. The reduction gear 4b of the power shaft 4 meshes with a reduction gear 10a rotatably supported on an end of the driving shaft 10 opposite to the engine. These gears 4b and 10a transmit driving force from the power shaft 4 to the driving shaft 10 at a reduction ratio suitable for driving the belt 15. A synchronous forward shifting means 12, provided on the side of the driving shaft 10 opposite to the engine, selectively couples the reduction gear 10a to the driving shaft 10. Namely, the shifting means 12 can be switched to two positions, i.e., to a forward-drive position "D" or a neutral position "N". The reduction gears 4b and 10a and the shifting means 12 form a direct drive mechanism 13 for forward movement, which is located in a first gear chamber 6a formed on a side of the transmission case 6 opposite to the engine. The first gear chamber 6a is lubricated with oil.

The driving pulley 11 includes a fixed sheave 11a fixed onto the driving shaft 10, a movable sheave 11b axially movably supported on the driving shaft 10 and an actuator 14 provided at the back of the movable sheave 11b. The actuator 14 is arranged to be closer to the engine than the belt 15. According to this embodiment, the actuator 14 is a ball screw that is axially moved by the ratio-changing motor 40. The actuator 14 includes a female screw member 14b rotatably supported by the movable sheave 11b via a bearing 14a, a male screw member 14c supported by the transmission case 6, and a ratio-changing gear 14d fixed to the outer periphery of the female screw member 14b. The ratio-changing gear 14d is larger in diameter and smaller in thickness than the movable sheave 11b of the driving pulley 11.

The driven pulley 21 includes a fixed sheave 21a fixed onto the driven shaft 20, a movable sheave 21b axially movably supported by the driven shaft 20 and an actuator 22 provided at the back of the movable sheave 21b. The actuator 22 is arranged on a side opposite to the engine beyond the V belt 15. The actuator 22, which is also a ball screw similar to the actuator 14 of the driving pulley 11, includes a female screw member 22b rotatably supported by the movable sheave 21b via a bearing 22a, a male screw member 22c supported by the transmission case 6, and a ratio-changing gear 22d fixed to the outer periphery of the female screw member 22b. The ratio-changing gear 22d is also larger in diameter and smaller in thickness than the movable sheave 21b of the driven pulley 21.

A reverse gear 24, which is rotatably supported on a portion of the driven shaft 20 closer to the engine than the driven pulley 21, meshes with the reverse gear 3b fixed to the input shaft 3. A synchronous reverse shifting means 25 selectively couples the gear 24 to the driven shaft 20. Namely, the shifting means 25 can be switched to two positions, i.e. to a reverse position "R" or the neutral position "N". The reverse gears 3b and 24 and the shifting means 25 form a direct drive mechanism 26 for reverse movement.

A reduction gear 27, which is integrally fixed on an end of the driven shaft 20 closer to the engine, meshes with a gear 30a fixed to the reduction shaft 30. This reduction gear 27 further meshes with a ring gear 31a of a differential gear unit 31 via a gear 30b integrally formed on the reduction shaft 30. The gears 30a and 30b of the reduction shaft 30 and the ring gear 31a form a reduction mechanism 29. The wheels are driven via the output shafts 32 provided on the differential gear unit 31. The direct drive mechanism 26 for reverse movement, the reduction shaft 30 and the differential gear unit 31 are located in a second gear chamber 6b formed on the side of the transmission case 6 closer to the engine. This gear chamber 6b is lubricated with oil. The forward gear 3a of the input shaft 3 and the forward gear 4a of the power shaft 4, which are also located in the gear chamber 6b, are similarly lubricated with oil.

The first and second gear chambers 6a and 6b of the transmission case 6 are lubricated with oil as hereinabove described. The driving pulley 11 and the driven pulley 21 are arranged in a pulley chamber 6c interposed between the first and second gear chambers 6a and 6b. According to this embodiment, the pulley chamber 6c is a non-lubricated space, and the belt 15 is formed by a dry-type belt.

In order to circulate the lubricating oil stored in the first and second gear chambers 6a and 6b axially separated from each other, a supply oil path and a return oil path are provided between those two chambers 6a and 6b. The supply oil path and the return oil path are defined by an axial hole 4c of the power shaft 4, and a radial clearance 5 between a second ratio-changing shaft 46 described later and the power shaft 4. Each of the axial hole 4c and the radial clearance 5 may define either the supply oil path or the return oil path. By circulating the oil though these paths, the clearance 5 between the power shaft 4 and the second ratio-changing shaft 46 can be lubricated as well.

Figure 7:
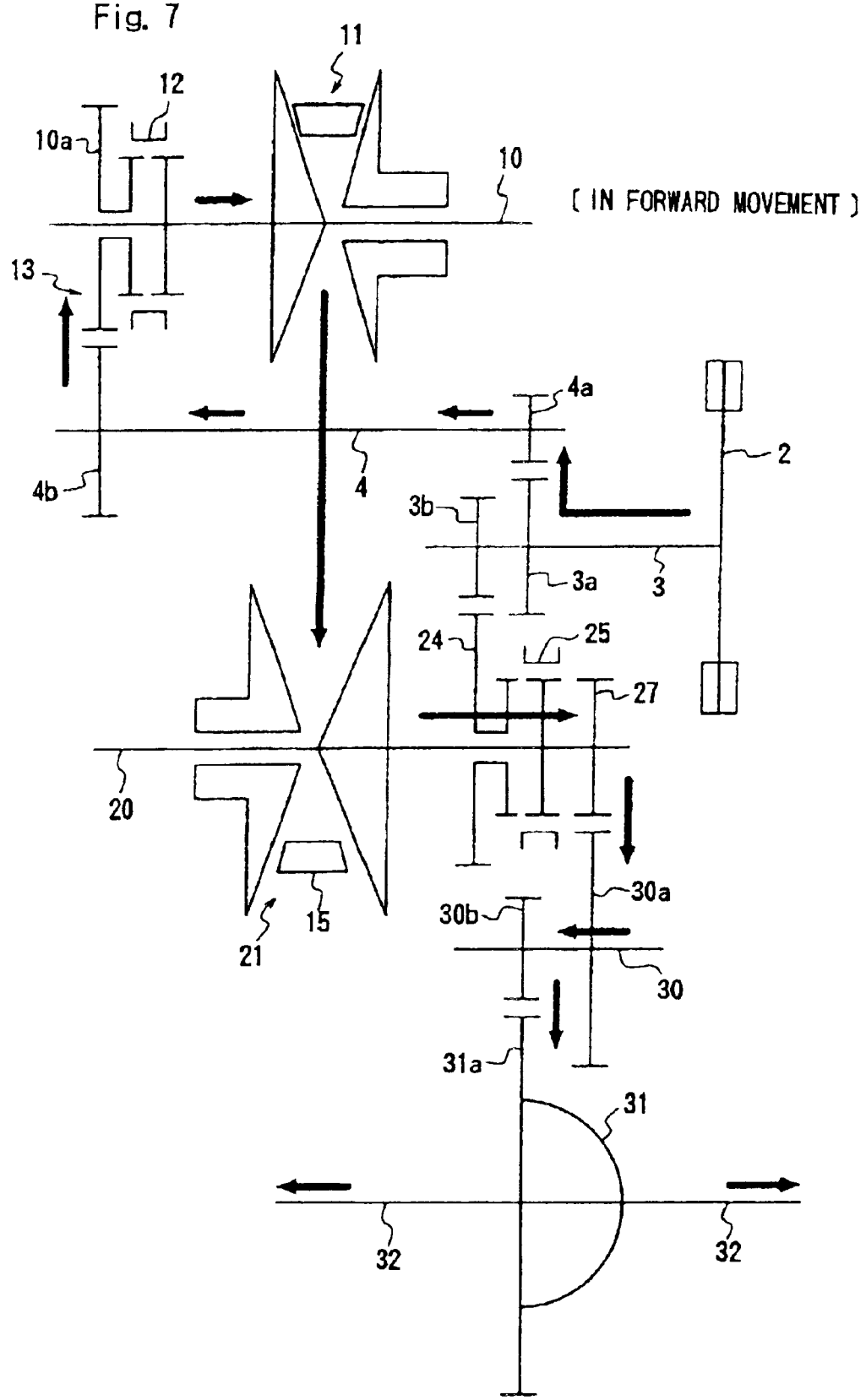
FIG. 7 is a skeleton diagram showing a power flow of the continuously variable transmission in forward movement.
Figure 8:
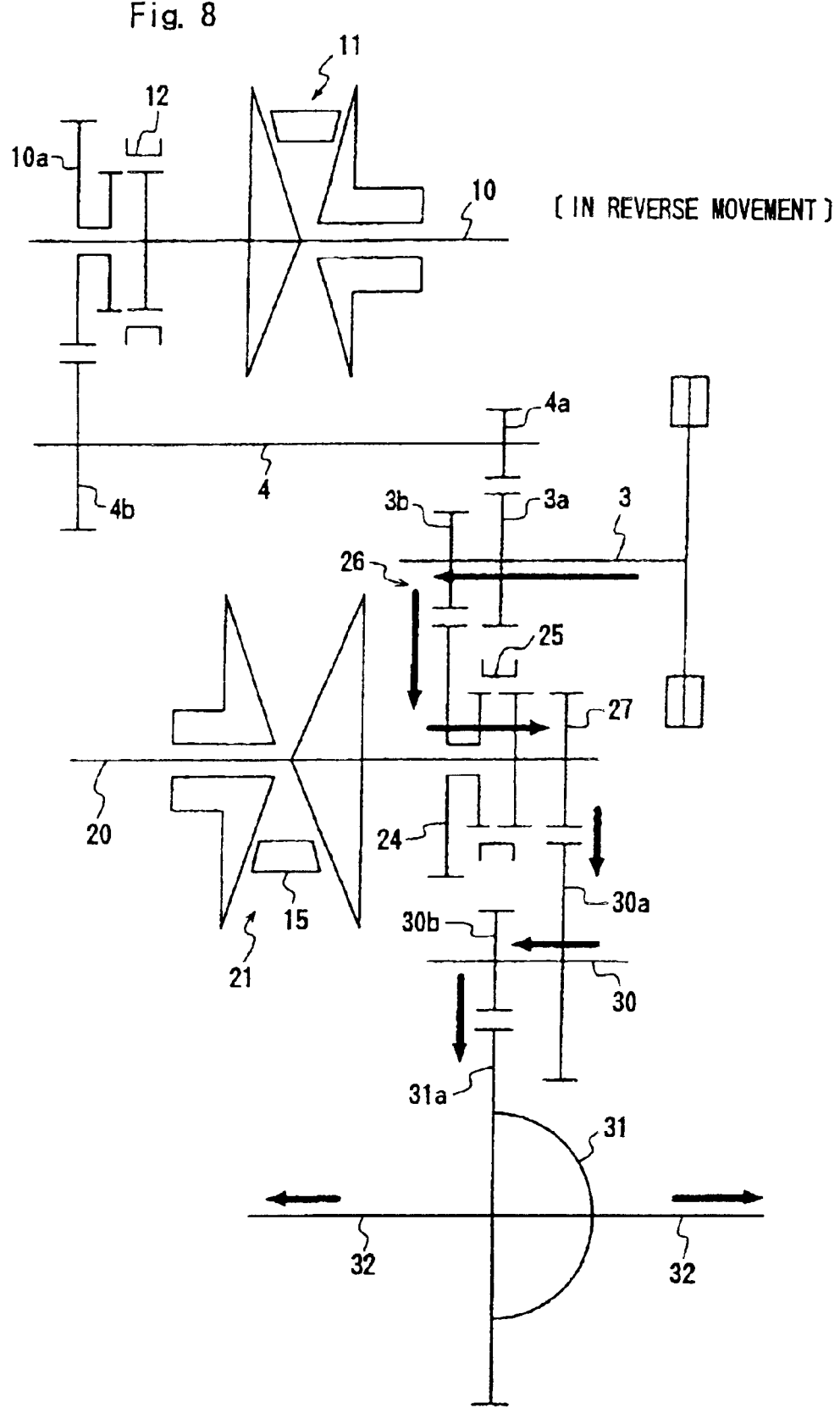
FIG. 8 is a skeleton diagram showing a power flow of the continuously variable transmission in reverse movement.

The power flows in forward movement and reverse movement of the continuously variable transmission having the aforementioned structure are described with reference to FIGS. 7 and 8.

In the forward movement, a shift lever is operated so as to switch the forward shifting means 12 to the forward drive position "D". At this time, the reverse shifting means 25 is automatically switched to the neutral position "N". As shown in FIG. 7, power inputted from the clutch 2 via the input shaft 3 is transmitted to the output shaft 32 via the forward gears 3a and 4a, the power shaft 4, the direct drive mechanism 13 for forward movement (the reduction gears 4b and 10a and the shifting means 12), the driving shaft 10, the driving pulley 11, the V-belt 15, the driven pulley 21, the driven shaft 20, the reduction gear 27, the reduction shaft 30 and the differential gear unit 31, as shown by thick arrows.

In the reverse movement, the shift lever is operated to move the reverse shifting means 25 to the reverse position "R". At this time, the forward shifting means 12 is automatically switched to the neutral position "N". As shown in FIG. 8, power input from the clutch 2 via the input shaft 3 is transmitted to the output shaft 32 via the direct drive mechanism 26 for reverse movement (the reverse gears 3b and 24 and the reverse shifting means 25), the driven shaft 20, the reduction gear 27, the reduction shaft 30 and the differential gear unit 31, as shown by thick arrows.

The tensioner 50 for pressing the slack side of the belt 15 is provided so as to supply belt tension as described later. When the belt 15 is reversely driven, the slack side of the belt alters to the tense side thereof, and hence the tensioner 50 disadvantageously presses the tense side so as to apply excessive load to the belt 15. According to this embodiment, however, a pulley unit defined by the driving pulley 11, the driven pulley 21 and the belt 15 is driven only in forward movement and not driven in reverse movement. Therefore, no reverse load is applied to the belt 15, whereby the burden on the belt 15 is reduced.

A transmission ratio changing mechanism in the transmission of the present invention is now described.

The ratio-changing motor 40 is mounted on the outer side of the transmission case 6, particularly on a position obliquely above the driving pulley 11. The motor 40 is, for example, a servo-motor having a brake 41, and its output gear 42 meshes with a reduction gear 43. The gears 42 and 43 are located in a motor housing 44 lubricated with oil, and previously assembled with each other. A shaft 43a of the reduction gear 43 projects from the motor housing 44. When the motor housing 44 is fixed to the transmission case 6, the shaft 43a is faucet-engaged with and integrally fixed to a sleeve-shaped first ratio-changing shaft 45 that is rotatably supported on the transmission case 6. Thus, the motor housing 44 is isolated from the inner space of the transmission case 6, whereby the lubricating oil stored in the motor housing 44 can be prevented from flowing into the transmission case 6. A gear 45a, provided on the first ratio-changing shaft 45, is a trapezoidal gear having a length corresponding to the moving stroke of the movable sheave 11b. This gear 45a meshes with the ratio-changing gear 14d provided on the driving pulley 21. When the gear 45a of the shaft 45 is rotated, the gear 14d responsively rotates so that the movable sheave 11b can be axially moved due to the action of the ball screw (the actuator 14). In other words, the running diameter of the belt 15 around the driving pulley 11 can be continuously changed.

The ratio-changing gear 14d of the driving pulley 11 also meshes with a first idler gear 46a of a sleeve-shaped second ratio-changing shaft 46 in which the power shaft 4 is rotatably received. Also, a second idler gear 46b of the second ratio-changing shaft 46 meshes with the ratio-changing gear 22d of the driven pulley 21. The idler gears 46a and 46b are also formed by trapezoidal gears having lengths corresponding to moving strokes of the movable sheaves 11b and 21b, similarly to the gear 45a of the first ratio-changing shaft 45. The torque of the ratio-changing motor 40 is transmitted to the ratio-changing gear 22d of the driven pulley 21 via the first ratio-changing shaft 45, the ratio-changing gear 14d of the driving pulley 11 and the second ratio-changing shaft 46. Therefore, the movable sheave 11a of the driving pulley 11 and the movable sheave 21a of the driven pulley 21 can synchronously move in the axial direction so as to change the running diameters of the belt 15 around the pulleys 11 and 21 radially in opposite directions to each other.

When the gear train (42, 43, 45, 14d, 46a, 46b and 22d) for transmitting the torque of the ratio-changing motor 40 are formed by reversible gears, they may be rotated by reactive force of the movable sheaves 11a and 21a due to the belt tension so as to disadvantageously change the transmission ratio. Therefore, the ratio-changing motor 40 is provided with the brake 41 for preventing the gears from undesirable rotation.

The unit for adjusting tension to the belt 15, i.e., the tensioner 50 is now described.

Figure 1:
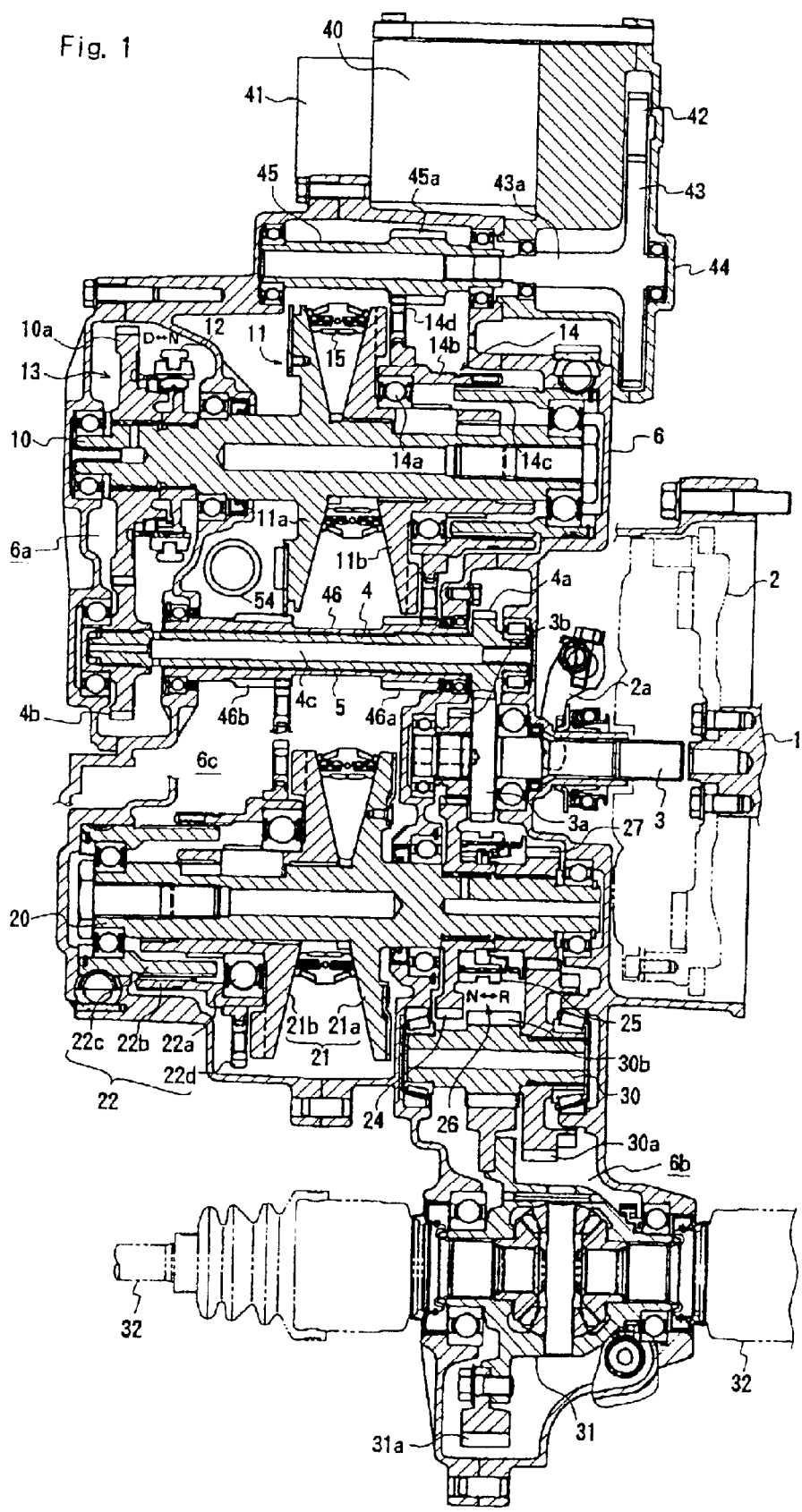
FIG. 1 is an expanded sectional view showing a continuously variable transmission according to a first embodiment of the present invention.
Figure 2:
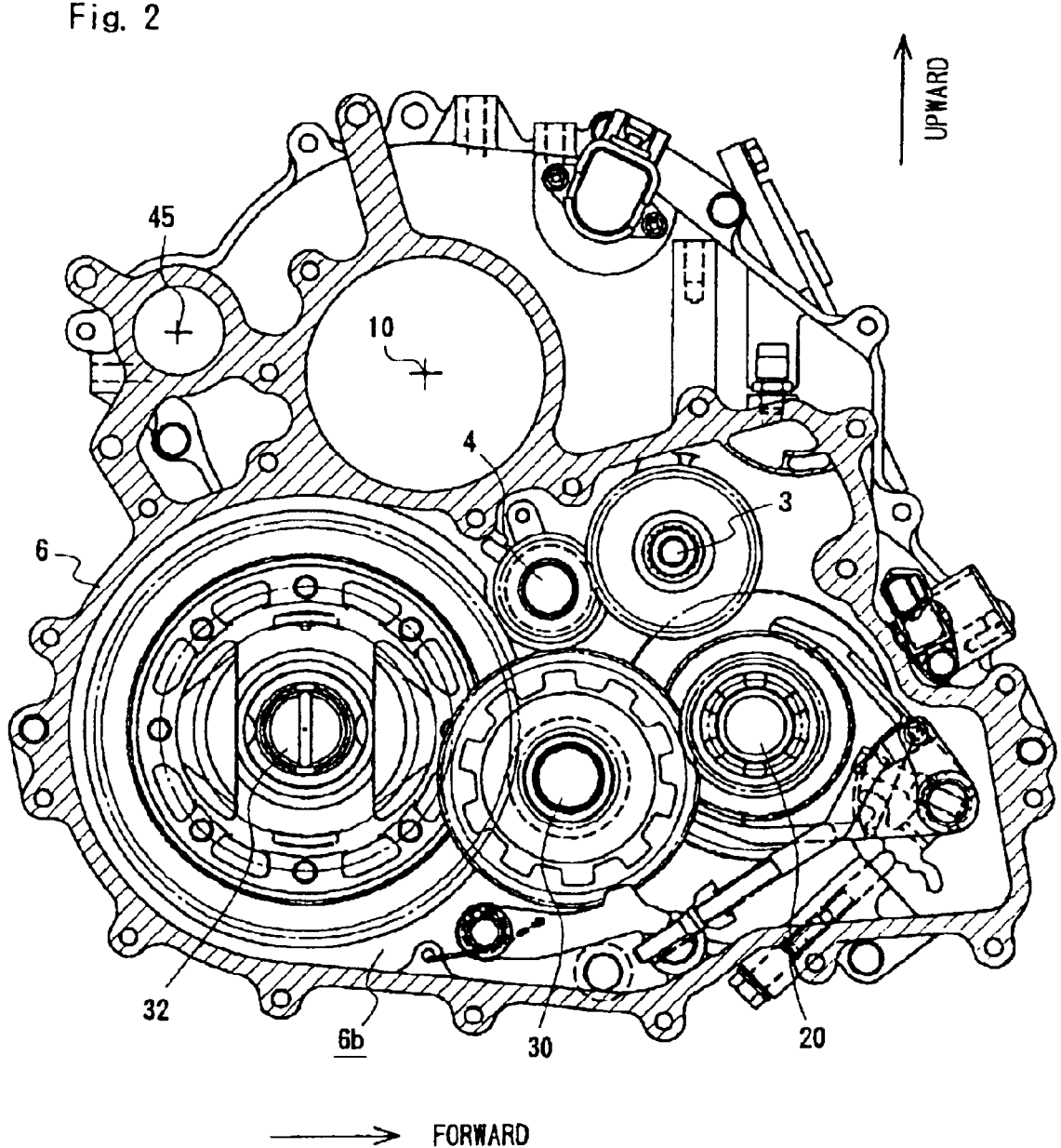
FIG. 2 is a side view of the internal structure of the continuously variable transmission shown in FIG. 1.
Figure 3:
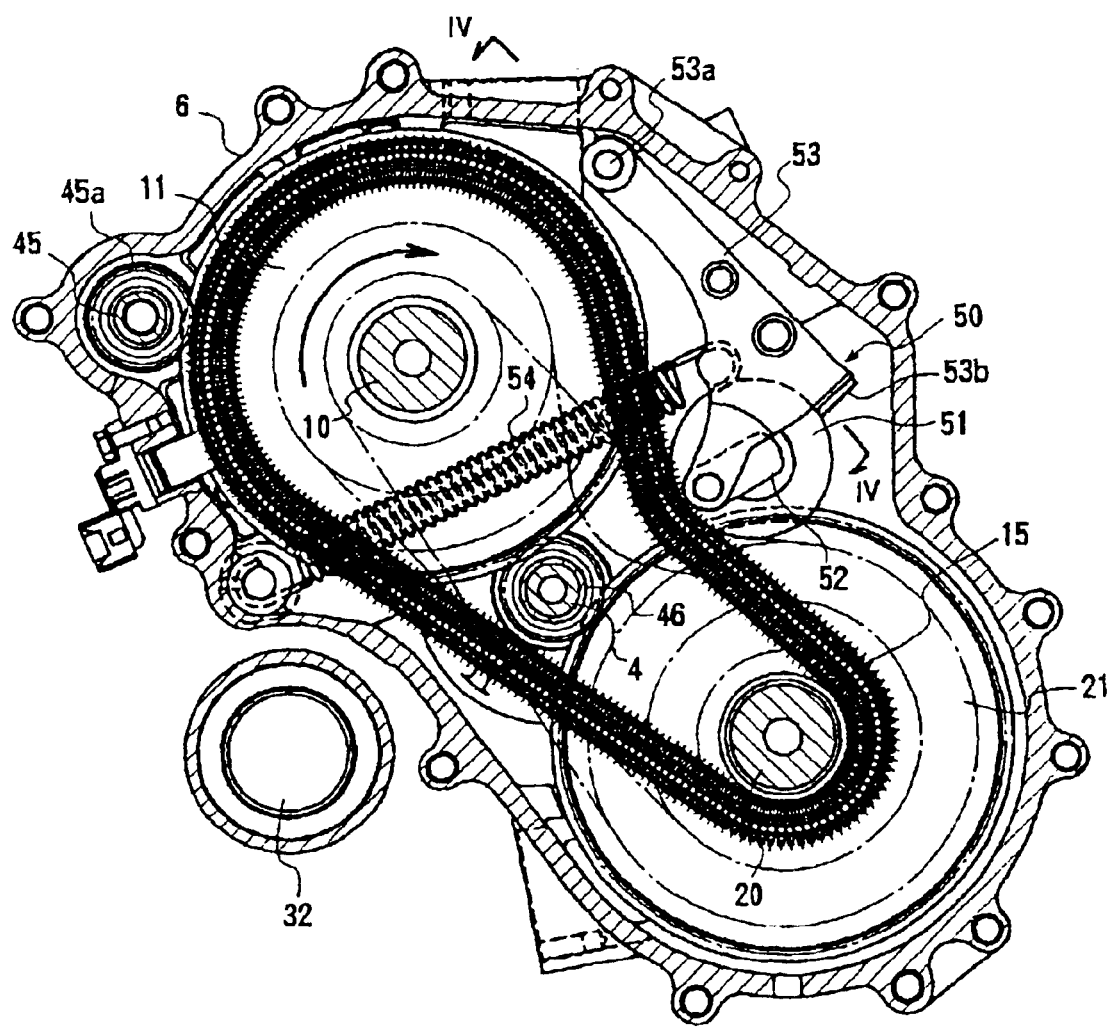
FIG. 3 is a sectional view of a pulley part of the continuously variable transmission shown in FIG. 1.
Figure 4:
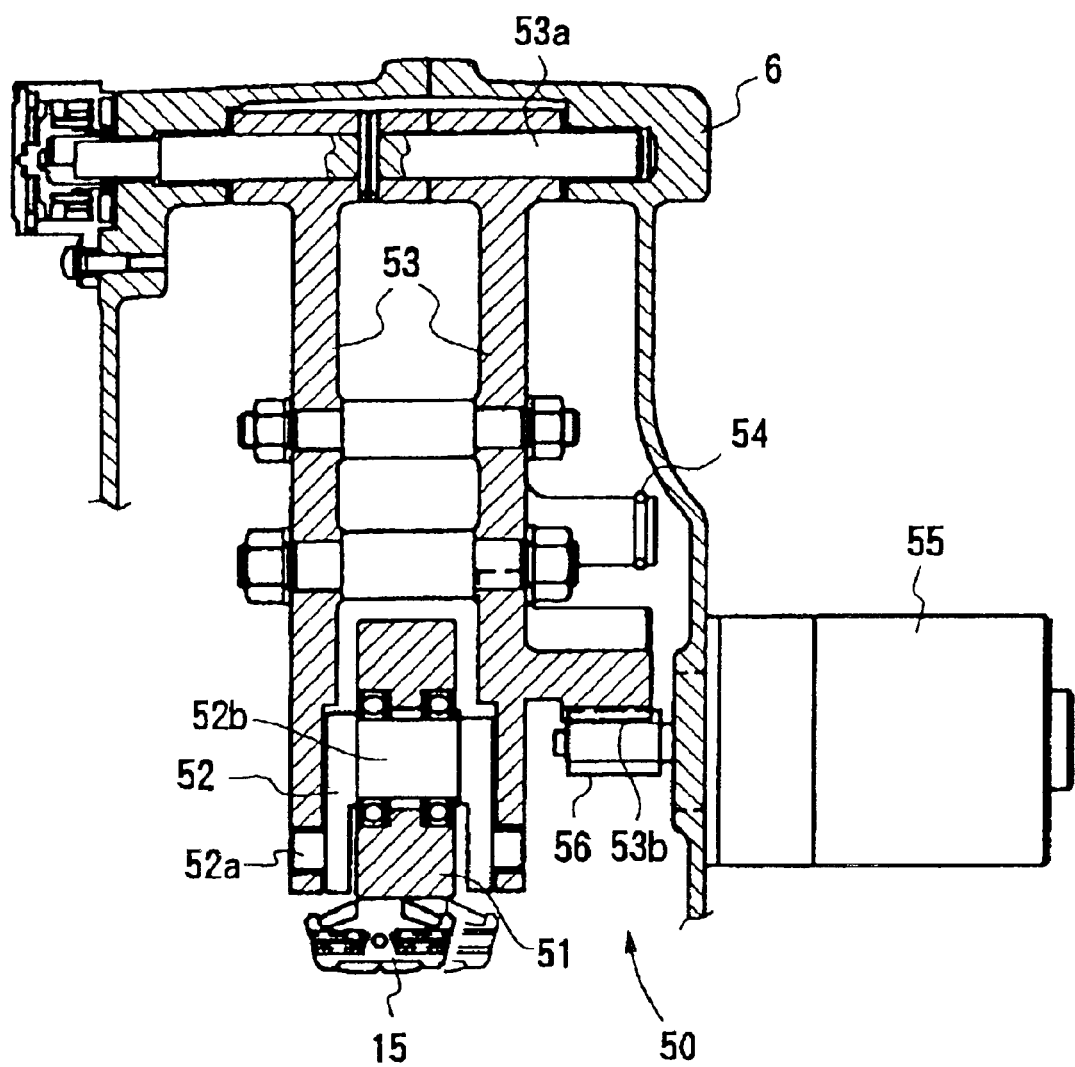
FIG. 4 is an enlarged sectional view taken along the line IV—IV in FIG. 3.

The ratio-changing motor 40 as hereinabove described changes the running diameters of the belt 15 around the pulleys 11 and 21. However, the belt 15 may slip with respect to the pulleys 11 and 21 depending on the transmitted torque. As shown in FIGS. 3 to 5, therefore, the tensioner 50 is provided for supplying tension to the belt 15 responsive to the transmitted torque. The tensioner 50 includes a tension roller 51, which is swingably supported by a swing arm 53 via a link member 52. The swing arm 53 has a rotation axis 53a, which is provided on a portion obliquely above the driving pulley 11, and is urged by a spring 54 toward the belt 15. Therefore, the tension roller 51 inwardly presses the slack side of the belt 15 with prescribed force. In this way, the tensioner 50 inwardly presses the belt 15 from outside in order to obtain prescribed belt tension as well as to increase the contact areas of the belt 15 around the pulleys 11 and 21, thereby improving the power transmittal efficiency. A shaft 52a located on an end of the link 52 is rotatably supported on the forward end of the arm 53, while a shaft 52b located on the other end of the link 52 rotatably supports the central portion of the tension roller 51. A gear 53b is formed on the outer peripheral surface of the forward end of the arm 53 so as to mesh with a pinion gear 56 of an assist motor 55 provided for controlling belt tension.

The aforementioned spring 54 supplies initial tension. The assist motor 55 is normally or reversely driven for adding or subtracting tension caused by the assist motor 55 to or from the initial tension so that the optimum belt tension can be obtained. In an automobile having relatively small fluctuation of the transmitted torque, however, the assist motor 55 may be omitted so that only the spring 54 supplies the tension.

Assuming that Ts represents belt tension resulting from the spring force of the spring 54 and Ta represents belt tension caused by the assist motor 55, final belt tension Tb can be expressed as follows:

$$Tb = Ts \pm Ta$$

For example, assuming that the belt tension Ts is equal to 500 N and the belt tension Ta is equal to 200 N, the final belt tension Tb can be rendered variable in the range of 300 N to 700 N. Therefore, even when the assist motor 55 generates relatively small torque, the belt tension can be varied over a wide range.

The aforementioned assist motor 55 is controlled by a controller, which is not shown. Various signals indicating the rotational speed of the driving shaft 10, the rotational speed of the driven shaft 20, input torque (torque inputted in the driving pulley 11) and the like are inputted into the controller, for controlling the assist motor 55 in response to the input torque or to the transmission ratio. Thus, the belt tension can be set to arbitrary characteristics shown in FIGS. 12 and 13.

Figure 12:
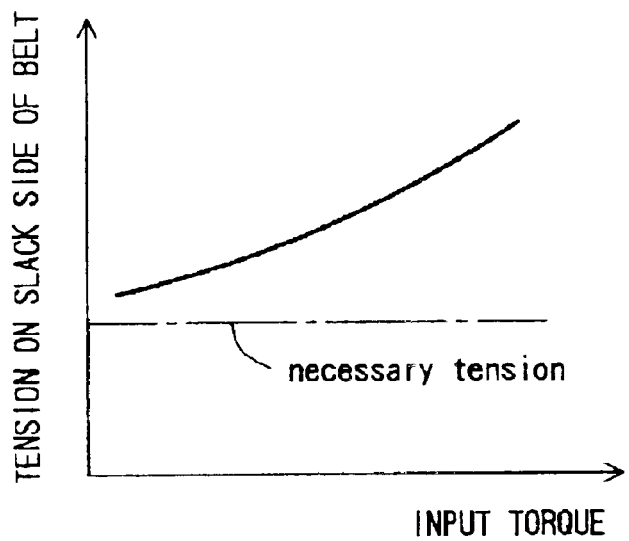
FIG. 12 illustrates the relation between input torque and tension on the slack side of the belt.

FIG. 12 shows the relation between the input torque and the tension on the slack side of the belt, which are so set that the belt tension is increased as the input torque is increased.

When the input torque is increased, the torque transmitted to the belt 15 is also increased in general, and hence it is preferable to increase the belt tension for preventing slipping in consideration of the power transmittal efficiency. Therefore, the assist motor 55 is controlled in response to the input torque transmitted to the driving pulley 11, for controlling the belt tension to the characteristic shown in FIG. 12. A torque sensor may be provided on the driving shaft 10 for detecting the input torque, or the input torque may be estimated from negative pressure of an engine suction pipe.

Figure 13:
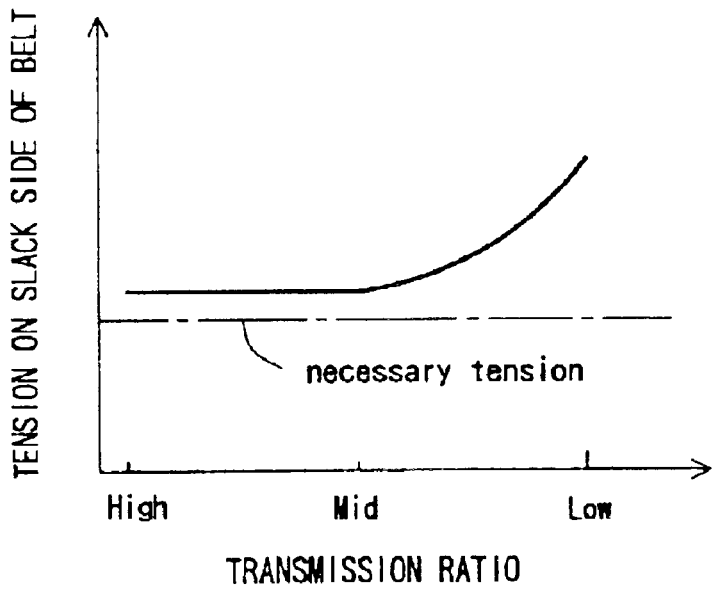
FIG. 13 illustrates the relation between the transmission ratio and the tension on the slack side of the belt.
Figure 14:
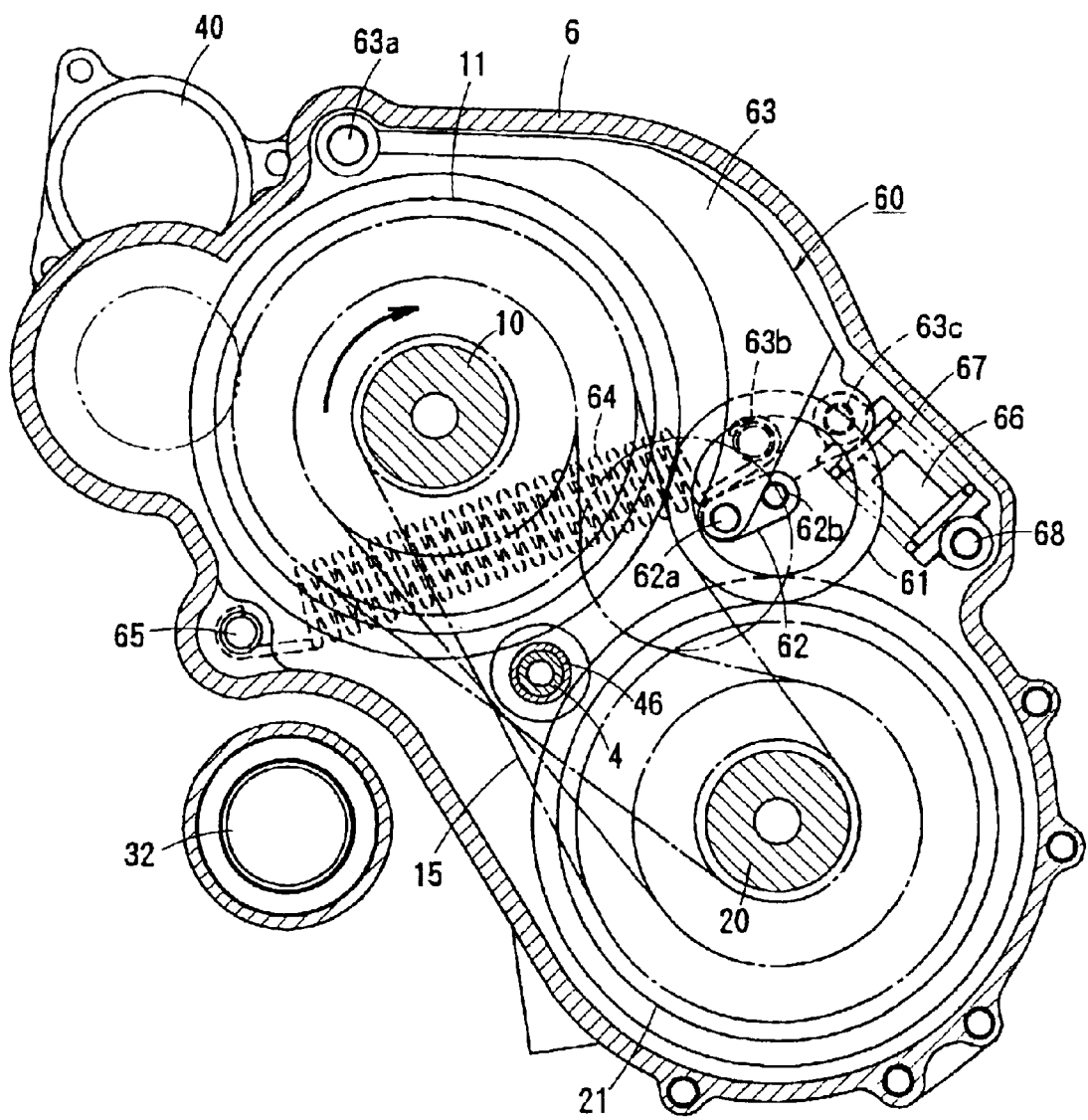
FIG. 14 is a sectional view of a pulley part of the continuously variable transmission according to a second embodiment of the present invention.
Figure 15:
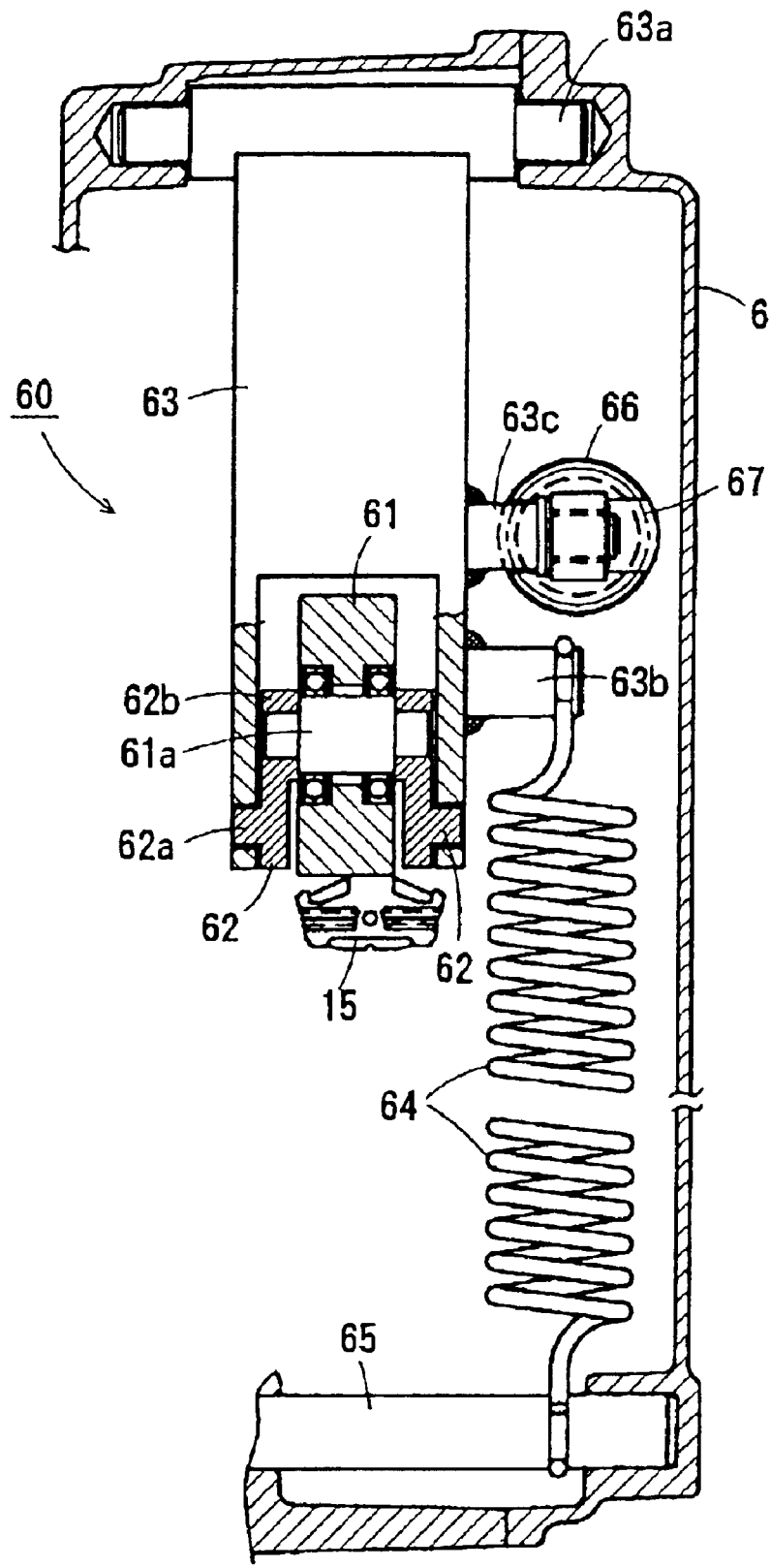
FIG. 15 is a partially fragmented sectional view of a tension-adjusting unit of the continuously variable transmission shown in FIG. 14.

FIG. 13 shows the relation between the transmission ratio and the tension on the slack side of the belt, which are so set that the belt tension is increased at the low range and reduced at the middle and high ranges. In general, the engine torque is increased at the low range for starting or uphill driving, and reduced at the high range for high-speed driving. At the low range, the running diameter of the belt around the driving pulley is small and hence large belt tension is necessary for attaining desirable power transmittal efficiency. On the other hand, at the middle and high ranges that are frequently employed, the belt tension is preferably set to the minimum necessary level in consideration of the life span of the belt. When the assist motor 55 is controlled in response to the transmission ratio so as to set the belt tension to the characteristic as shown in FIG. 13, therefore, desirable characteristic of the belt tension, where good power transmittal efficiency and long life span of the belt can be obtained, will be realized. The transmission ratio can be readily obtained from the ratio of the rotational speed of the driving shaft to the rotational speed of the driven shaft.

Figure 9:
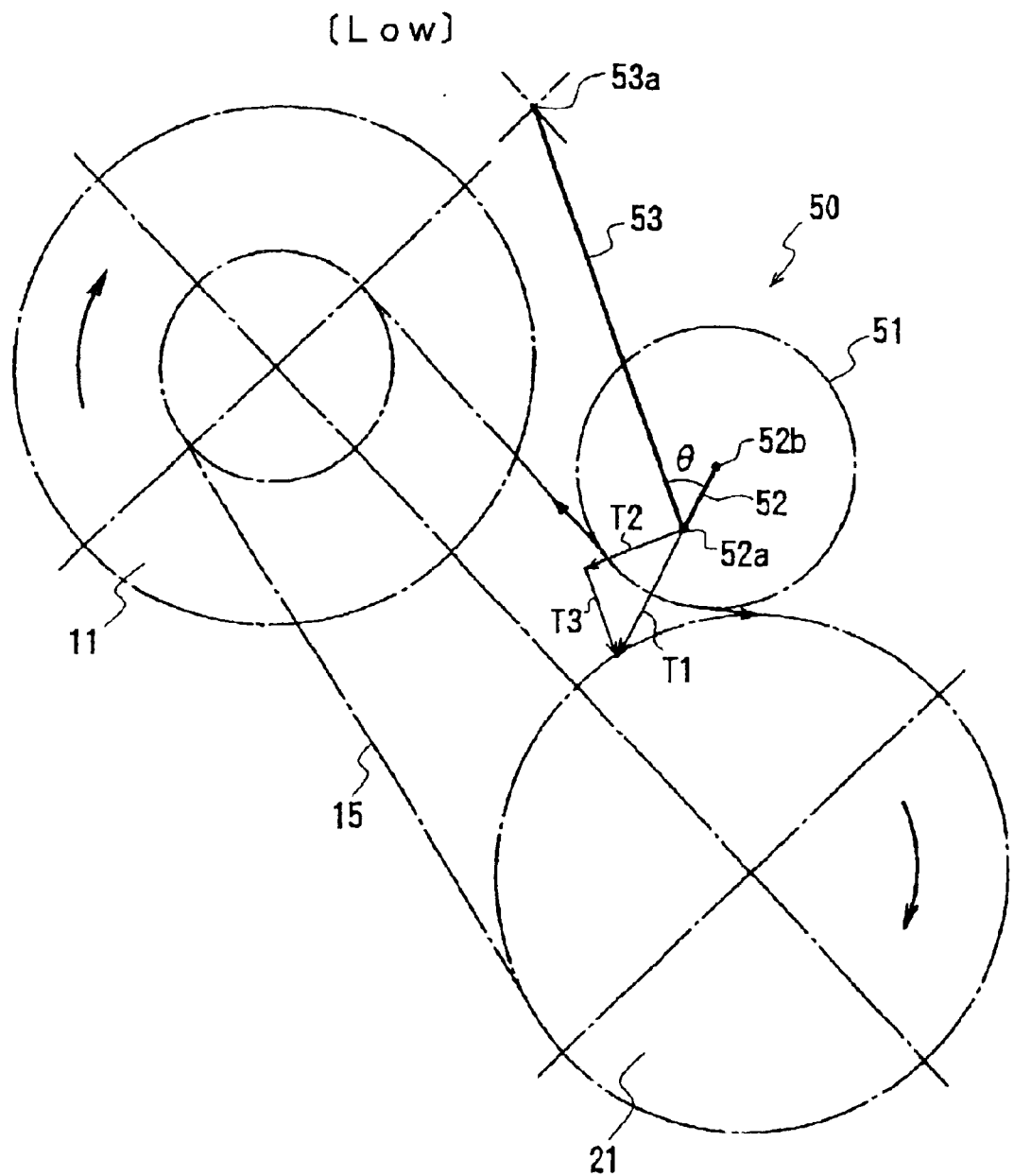
FIG. 9 illustrates a contact position of a tension roller to a belt at a low transmission ratio.
Figure 10:
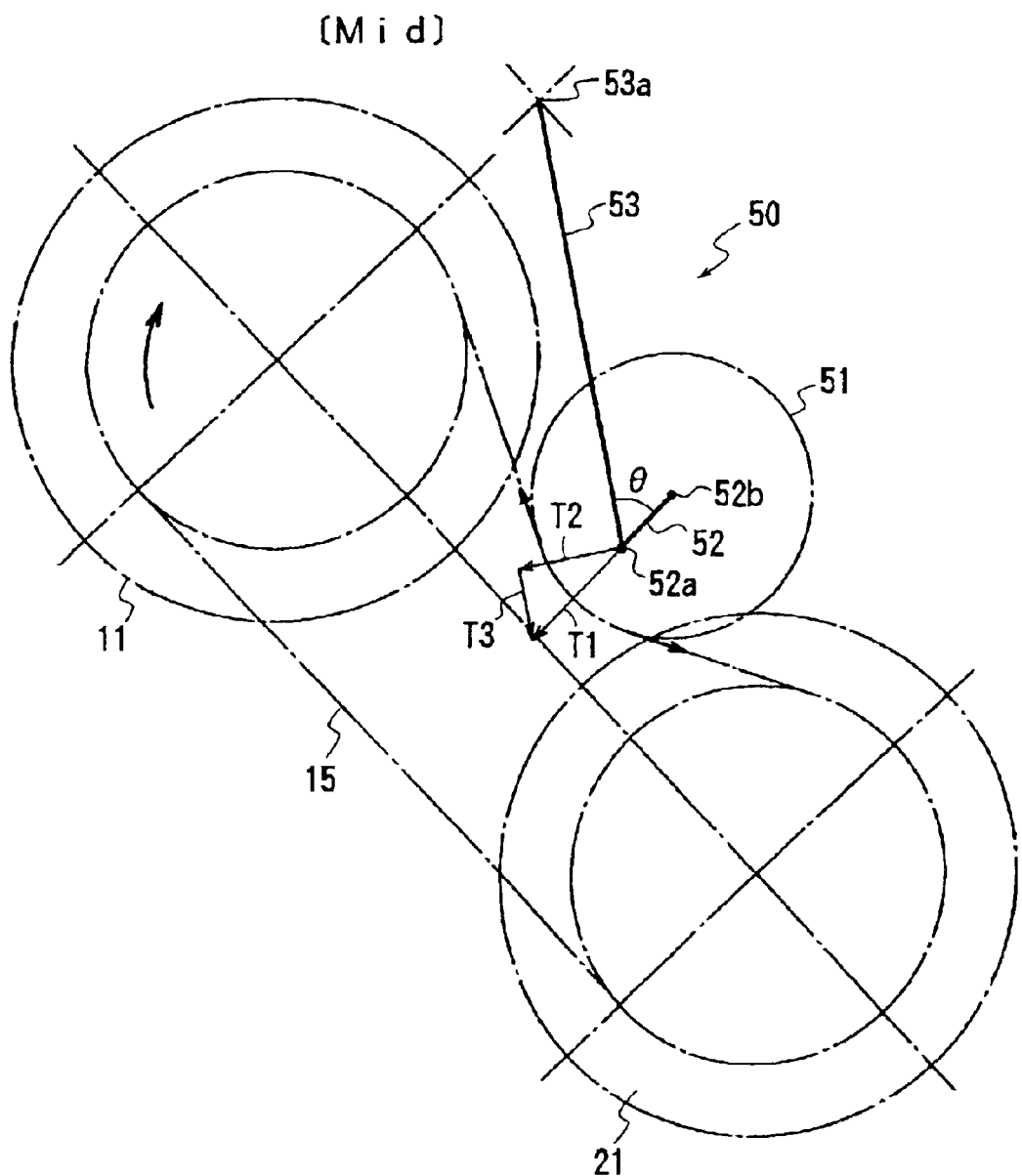
FIG. 10 illustrates a contact position of the tension roller to a belt at a middle transmission ratio.
Figure 11:
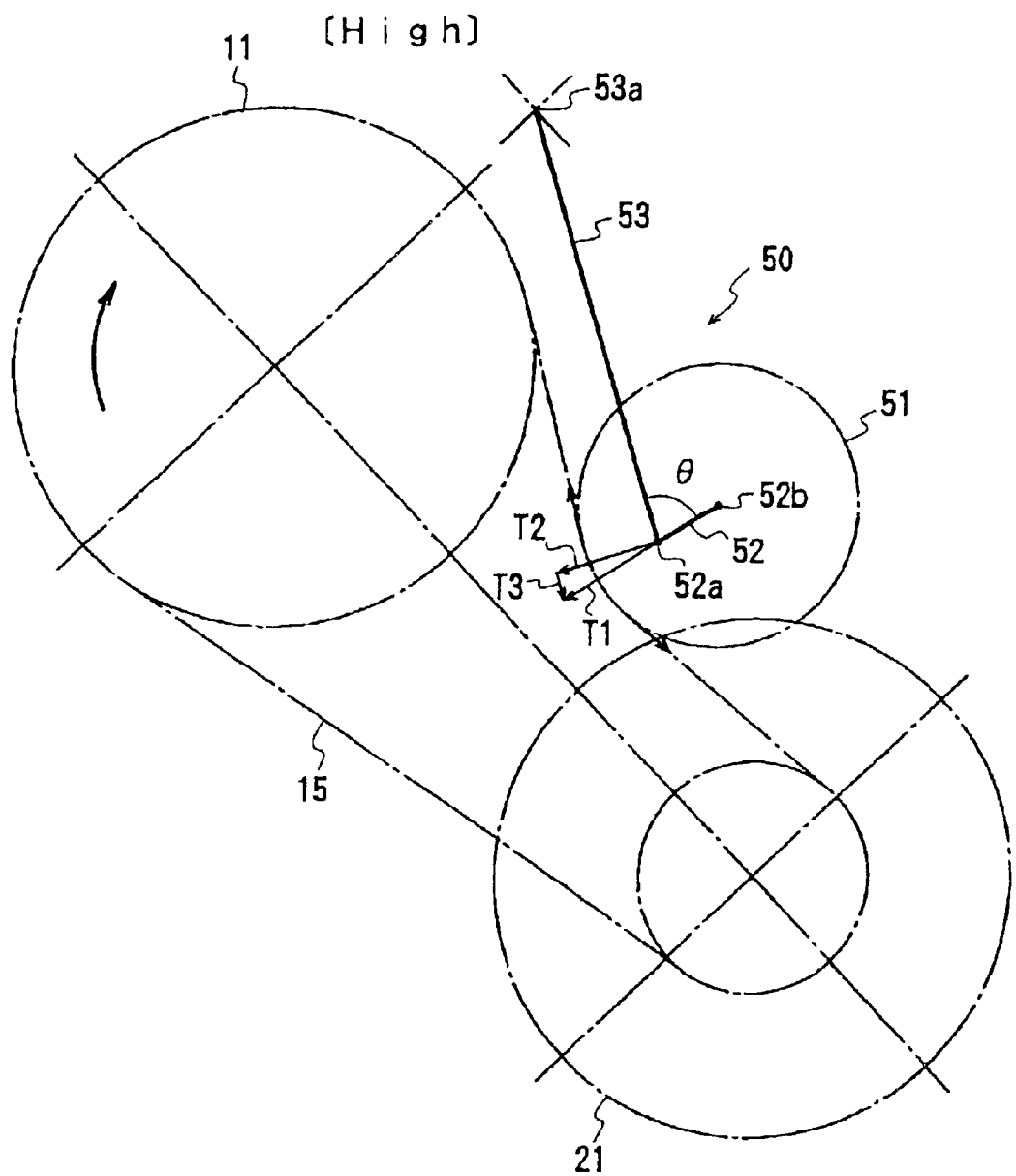
FIG. 11 illustrates a contact position of the roller to a belt at a high transmission ratio.

In the aforementioned tensioner 50, the tension roller 51 is mounted on the arm 53 via the link 52, such that it does not interfere with either pulley 11 or 12. The reason for this linkage structure is described with reference to FIGS. 9 to 11. If the tension roller 51 is directly mounted on the arm 53 as in the prior art, the tension roller 51 moves along a rotation locus of the arm 53 about the rotation axis 53a. When the transmission ratio of this continuously variable transmission is changed from the lowest transmission ratio to the highest transmission ratio, the tension roller 51 may interfere with either pulley 11 or 21. The tension roller 51 readily interferes with either pulley particularly when the same is prepared from a large-sized roller for reducing the burden applied on the belt 15. On the other hand, when the tension roller 51 is mounted on the arm 53 via the link 52, a linkage structure having two degrees of freedom is attained. In this case, the angle θ between the arm 53 and the link 52 automatically changes and the tension roller 51 can automatically move to a position where it does not interfere with either pulley 11 or 21 at the lowest transmission ratio as shown in FIG. 9, at the middle transmission ratio as shown in FIG. 10 and at the highest transmission ratio as shown in FIG. 11 respectively. Therefore, interference between the tension roller 51 and either pulley 11 or 21 can be reliably prevented even when the tension roller 51 has a large diameter as described in this embodiment.

The tensioner 50 is not restricted to the aforementioned linkage structure having two degrees of freedom, but two links may be employed for attaining a linkage structure having three degrees of freedom.

The rotation axis 53a of the arm 53 is arranged in the vicinity of the driving pulley 11 for the following reason: vertical pressing force T1 applied from the tension roller 51 to the belt 15 varies depending on the transmission ratio as shown in FIGS. 9 to 11, so as to generate belt tension proportionate to the pressing force T1. The pressing force T1 is given by the vector sum of spring force T2 of the spring 54 and force T3 perpendicular thereto. In this case, the urging force of the assist motor 55 is ignored. When the rotation axis 53a of the arm 53 is arranged in the vicinity of the driving pulley 11 as hereinabove described, the angle θ made between the arm 53 and the link 52 changes depending on the transmission ratio, so that the pressing force T1 at the middle and the high ranges becomes smaller than that at the low range. Therefore, a belt tension characteristic substantially similar to that shown in FIG. 13 can be obtained by using only the spring 54, without the assist motor 55.

FIGS. 14 to 22 show a continuously variable transmission according to a second embodiment of the present invention. The transmission according to the second embodiment is similar in structure to the transmission according to the first embodiment except a tension-adjusting unit (tensioner) 60. Therefore, parts of the second embodiment identical to those of the first embodiment are denoted by the same reference numerals, to omit redundant description.

The feature of the second embodiment resides in that a first spring 64 and a second spring 67 are provided on the tensioner 60 in order to apply joined urging force of the springs 64 and 67 to a swing arm 63. In this case, no assist motor is employed.

The tensioner 60 includes a tension roller 61, which is swingably supported by the arm 63 via a link member 62. A rotation axis 63a of the arm 63 is supported on a transmission case 6 above a driving pulley 11. As shown in FIG. 16, a pin 63b to be hooked by an end of the tension spring (first spring) 64 projects from the side surface of the forward end of the arm 63. The other end of the tension spring 64 is attached to a shaft 65 provided on the transmission case 6. Therefore, the arm 63 is rotationally urged by the spring 64 so that the tension roller 61 inwardly presses the slack side of an endless V belt 15. The tensioner 60 thus inwardly presses the belt 15 from outside in order to obtain prescribed belt tension as well as to increase the contact areas of the belt 15 around the pulleys 11 and 21, thereby improving power transmittal efficiency. The link 62 has a pivot or a shaft 62a on an end thereof and the shaft 62a is rotatably supported on the forward end of the arm 62. The link 62 also has the other end 62b that supports a central shaft 61a of the tension roller 61. A hinge pin or a shaft 63c projects from a side surface of the forward end of the arm 63, and an end of an expansion guide 66 is rotatably coupled to the shaft 63c. The other end of the expansion guide 66 is rotatably coupled to a shaft 68 provided on the transmission case 6. The compression spring (second spring) 67 is mounted in the expansion guide 66, to be guided by the expansion guide 66 only in an expansion direction, so as not to be distorted or bent when the spring 67 and the guide 66 swing around the shaft 68.

Operation of the belt pressing force of the tension roller 61 caused by the tension spring 64 and the compression spring 67 depending on the transmission ratio is now described with reference to FIGS. 17 to 22.

Figure 18:
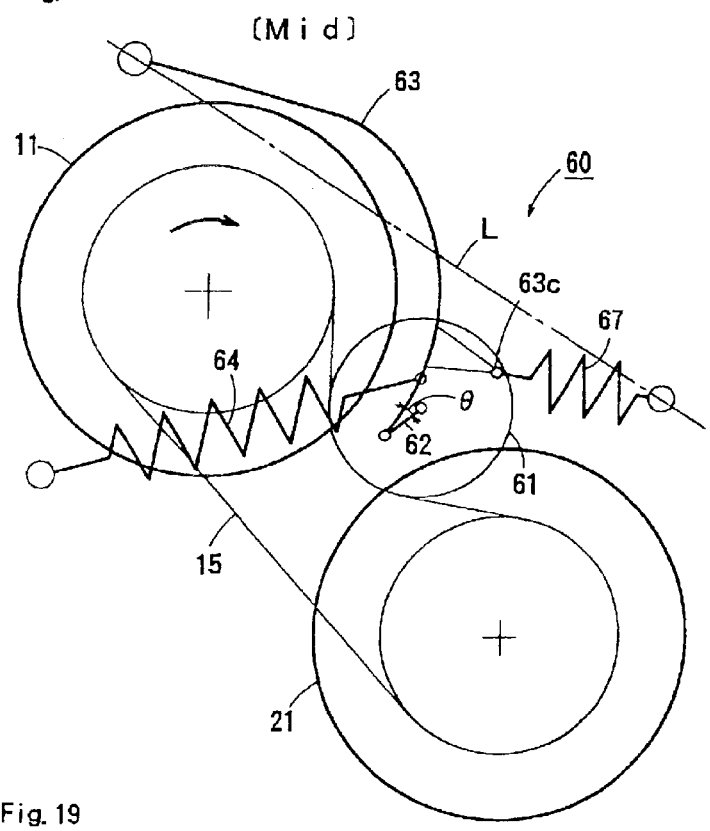
FIG. 18 illustrates a position of contact between the tension roller and the belt at the middle transmission ratio in the continuously variable transmission shown in FIG. 14.
Figure 19:
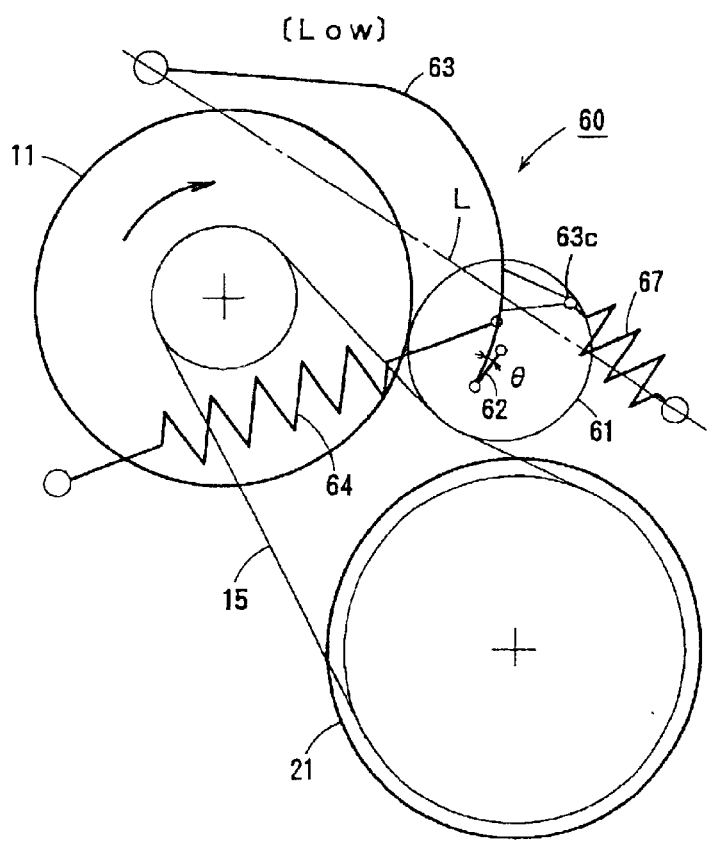
FIG. 19 illustrates a position of contact between the tension roller and the belt at the lowest transmission ratio in the continuously variable transmission shown in FIG. 14.
Figure 20:
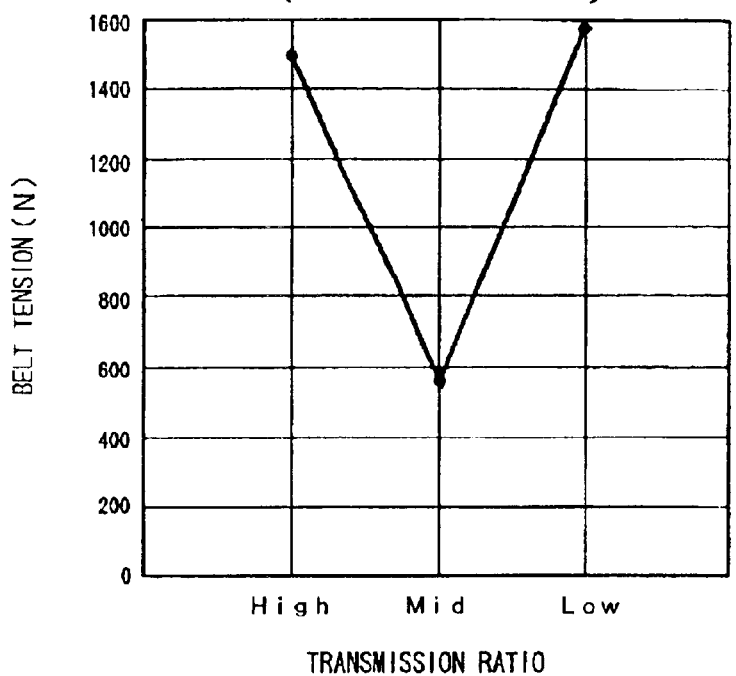
FIG. 20 illustrates the relation between belt tension and the transmission ratio when only a tension spring is used.
Figure 21:
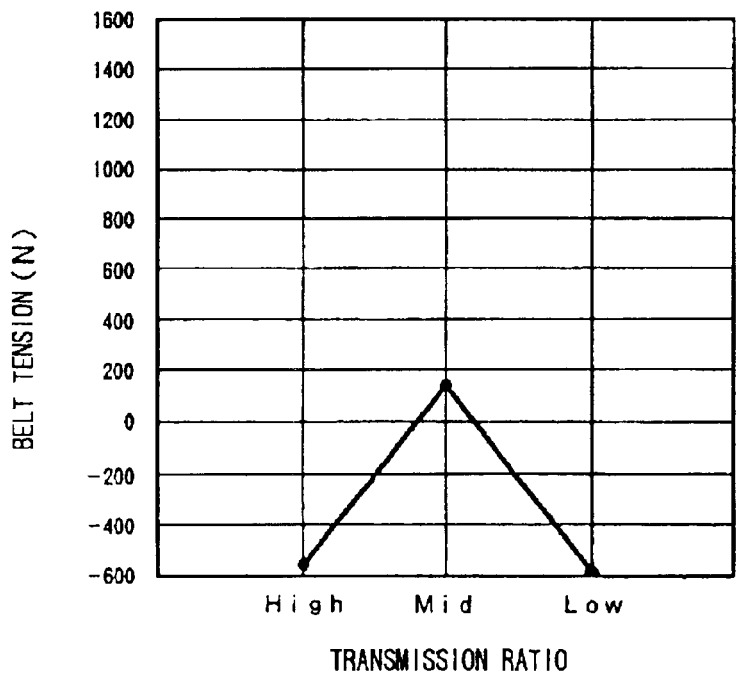
FIG. 21 illustrates the relation between the belt tension and the transmission ratio when only a compression spring is used.
Figure 22:
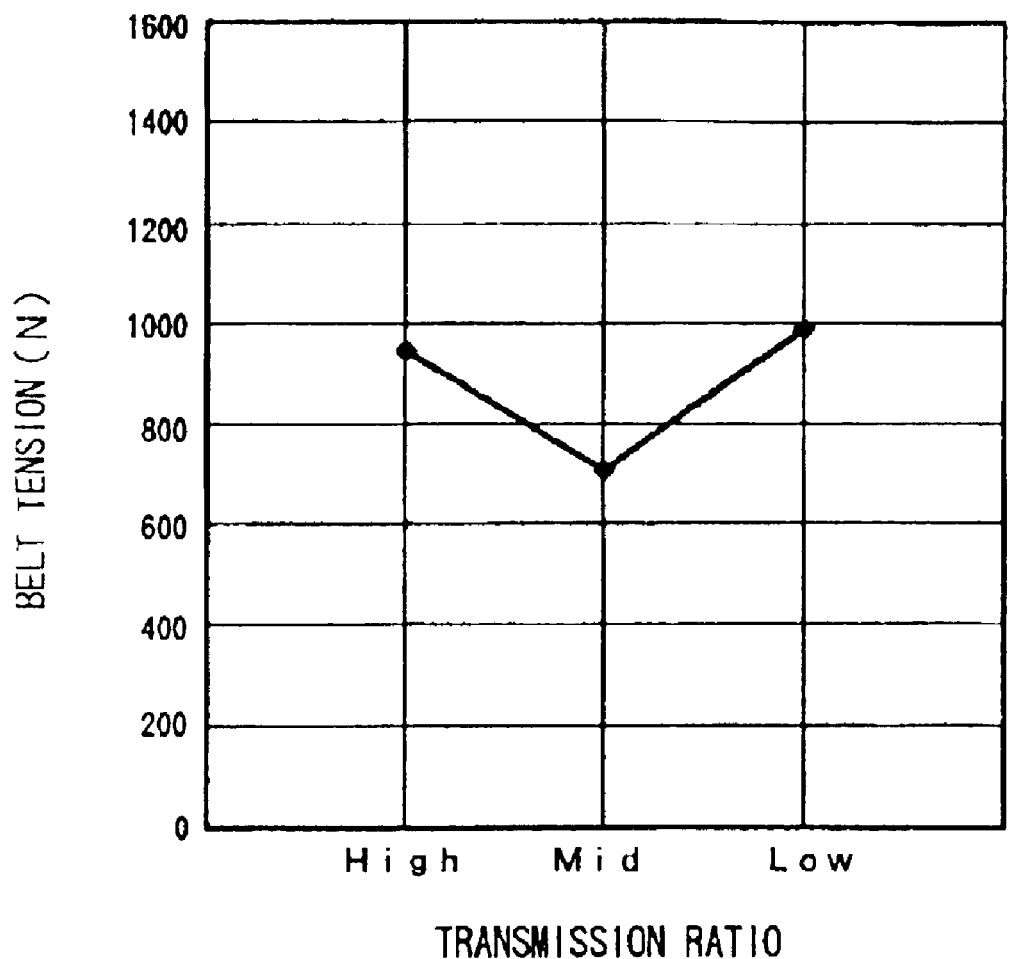
FIG. 22 illustrates the relation between the belt tension and the transmission ratio when both of the tension spring and the compression spring are used.

FIGS. 17, 18 and 19 show motions of the pulley unit at the highest transmission ratio, at the middle transmission ratio and at the lowest transmission ratio respectively. FIGS. 20, 21 and 22 show changes of the belt tension in cases when only the tension spring 64 is used, when only the compression spring 67 is used, and when both of the springs 64 and 67 are used respectively.

As FIGS. 17 and 19 clearly show, the belt 15 has little allowance in its length at the lowest and highest transmission ratios. Hence the amount of distortion of the belt 15 caused by the tension roller 61 is so small that the tension roller 61 is not dropped between the pulleys 11 and 21. On the other hand, at the middle transmission ratio, the belt 15 has an allowance in its length as shown in FIG. 18. Hence the amount of distortion of the belt 15 caused by the tension roller 61 is so large that the tension roller 61 is deeply dropped between the pulleys 11 and 21.

The fulcrum 65 of the tension spring 64 mounted to the transmission case 6 is located opposite to the arm 63 beyond the belt 15. Therefore, the spring force of the tension spring 64 acts in such a direction (direction A) that the tension roller 61 inwardly presses the belt 15. As shown in FIG. 20, the belt tension caused by the tension spring 64 at the middle transmission ratio is much smaller than those at the high and the low transmission ratios.

On the other hand, the compression spring 67 is arranged in the vicinity of a straight line L connecting its fulcrum 68 to the transmission case 6 and the rotation axis 63a of the arm 63. The coupling point 63c of the compression spring 67 to the arm 63 is located oppositely to the belt 15 beyond the line L at the high and the low transmission ratios, and located closer to the belt 15 than the line L at the middle transmission ratio. Therefore, the spring force of the compression spring 67 acts in a direction (direction B) for separating the tension roller 61 from the belt 15 at the high and the low transmission ratios, and in the direction (direction A) for pressing the belt 15 with the tension roller 61 at the middle transmission ratio. In other words, as shown in FIG. 21, the belt tension caused by the compression spring 67 works on the plus side (pressing side) at the middle transmission ratio, whereas it works on the minus side (pulling side) at the high and the low transmission ratios.

As a result, when the belt tensions caused by the springs 64 and 67 are added up, the difference between the belt tension at the high and the low transmission ratios and that at the middle transmission ratio is reduced so as to attain desired tension characteristics, as shown in FIG. 22. For example, when the joined belt tension at the middle transmission ratio is set to the minimum necessary value (e.g., 700 N) for preventing slip of the belt 15 on the pulleys, the joined belt tension at the high and the low transmission ratios can be suppressed to about 950 to 1000 N, so as to prevent reaching an excessive level. Therefore, both prevention of slipping of the belt 15 and improvement of the life span of the belt 15 can be compatibly attained.

Although the amounts of distortion of the tension spring 64 at the highest and the lowest transmission ratios are the same, the belt tension at the lowest transmission ratio is slightly higher than that at the highest transmission ratio, as shown in FIG. 20. This is because the rotation axis 63a of the arm 63 is arranged on the side of the driving pulley 11.

In this second embodiment, the coupling point 63c of the compression spring 67 to the arm 63 is located opposite to the belt 15 beyond the straight line L at the high and the low transmission ratios and is located closer to the belt 15 than the line L at the middle transmission ratio. However, the present invention is not restricted to this embodiment but the coupling point 63c may be located opposite to the belt 15 beyond the line L or located closer to the belt 15 than the line L regardless of the transmission ratio.

When the tension caused by the tension spring 64 reaches an excessive level at the highest and the lowest transmission ratios as shown in FIG. 20, however, the coupling point 63c is preferably set to be located opposite to the belt 15 beyond the line L at the lowest and highest transmission ratios so that the belt tension at those ratios can be reduced by the compression spring 67.

The value of the belt tension caused by the compression spring 67 at the middle transmission ratio may not necessarily be on the plus side (pressing side) but may alternatively be on the minus side or zero.

The present invention is not restricted to the aforementioned embodiments.

For example, the rotation axes of the arms 53 and 63 may not necessarily be outside of the driving pulley 11, but may be provided coaxially with the driving pulley 11 or with the driven pulley 21.

Although one end of the arms 53 and 63 are swingably supported on the transmission case 6 and the other end thereof are rotatably coupled to the links 52 and 62 respectively in the aforementioned embodiments, the present invention is not restricted to these structures. For example, an intermediate portion of the arm 53 or 63 may be swingably supported on the transmission case 6, so that the link 52 or 62 is coupled to an end and an urging means is coupled to the other end.

Similarly, the coupling points of the tension rollers 51 and 61 to the links 52 and 62 respectively, and the coupling points of the links 52 and 62 to the arms 53 and 63 respectively may not necessarily be located on both ends of the links 52 and 62.

Although the spring 54 and the assist motor 55 are employed as the means for urging the arm 53 in the direction for pressing the belt 15 in the first embodiment, a hydraulic/pneumatic cylinder or a solenoid may alternatively be employed in place of the assist motor 55.

In the second embodiment, though the tension spring 64 is employed as the first spring for rotationally urging the arm 63, a compression spring may alternatively be employed or a torsion spring may be provided on the rotation axis 63a of the arm 63. The coupling position of the first spring 64 to the arm 63 may not necessarily be the forward end (the side closer to the tension roller) of the arm 63. When an intermediate portion of the arm 63 is swingably supported on the transmission case 6, the first spring 64 may be coupled to the other end of this arm 63, which extends oppositely to the forward end.

What is claimed is:

1. A continuously variable transmission comprising an endless belt running across a driving pulley and a driven pulley, a transmission ratio changing mechanism for changing the running diameters of said belt around said pulleys radially in opposite directions to each other and a tension-adjusting unit for pressing said belt to obtain belt tension, wherein said tension-adjusting unit includes:

a tension roller coming into pressure contact with the slack side of said belt from outside, a swing arm swingably mounted on a transmission case, at least one link member, pivotably attached to said swing arm, for linking said tension roller to said swing arm, and urging means for swingingly urging said swing arm in such a direction that said tension roller presses said belt.

2. The continuously variable transmission according to claim 1, wherein a rotation axis of said swing arm is provided on a position outside of said driving pulley and closer to said driving pulley than to said driven pulley.

3. The continuously variable transmission according to claim 1 or 2, wherein said urging means for swingingly urging said swing arm is a spring which swingingly urges said swing arm in such a direction that said tension roller presses the slack side of said belt from outside.

4. The continuously variable transmission according to claim 1 or 2, wherein said urging means for swingingly urging said swing arm includes a spring which swingingly urges said swing arm in such a direction that said tension roller presses the slack side of said belt from outside and an assist motor which adjusts the rotational force of said swing arm so as to control the pressing force of said tension roller.

5. The continuously variable transmission according to claim 4, wherein said assist motor is provided with a drive gear and said swing arm is provided with an arcuate gear whose center of curvature corresponds to a rotation axis of said swing arm, in such a way that said drive gear meshes with said arcuate gear of said swing arm.

6. The continuously variable transmission according to claim 1 or 2, wherein said urging means for swingingly urging said swing arm includes:

a first spring for swingingly urging said swing arm in such a direction that said tension roller presses said belt such that the urging force of said first spring at a highest transmission ratio and a lowest transmission ratio exceeds the urging force of said first spring at a middle transmission ratio, and a second spring formed by a compression spring having an end rotatably supported on said transmission case and another end rotatably coupled to said swing arm, wherein said second spring is provided on a position where its urging force direction changes depending on the transmission ratio such that the rotational force of said swing arm in a direction for pressing said belt caused by said second spring at the middle transmission ratio exceeds the rotational forces of said swing arm in the direction for pressing said belt caused by said second spring at the highest transmission ratio and the lowest transmission ratio.

7. The continuously variable transmission according to claim 6, wherein said second spring is so arranged that a coupling point of said second spring to said swing arm at the highest transmission ratio and the lowest transmission ratio is located opposite to said belt with reference to a straight line (L) connecting a fulcrum of said second spring and said rotation axis of said swing arm.

8. The continuously variable transmission according to claim 1 or claim 2, wherein said transmission ratio changing mechanism includes a ratio-changing motor, a first ball screw axially moving a movable sheave of said driving pulley by rotation of a ratio-changing gear, a second ball screw axially moving a movable sheave of said driven pulley by rotation of a ratio-changing gear, and a gear train transmitting the torque of said ratio-changing motor to said ratio-changing gears of said driving pulley and said driven pulley.

* * * * *